United States Patent [19]

Tadokoro et al.

[11] 4,278,639

[45] Jul. 14, 1981

[54] CATALYTIC CONVERTER FOR PURIFYING GASES

[75] Inventors: Tomoo Tadokoro; Yasuo Honda, both of Hiroshima, Japan

[73] Assignee: Toyo Kogyo Co., Ltd., Hiroshima, Japan

[21] Appl. No.: 130,445

[22] Filed: Mar. 14, 1980

[30] Foreign Application Priority Data

Mar. 19, 1979 [JP] Japan .............................. 54-36420[U]

[51] Int. Cl.³ ........................ B01D 53/36; F01N 3/28; F01N 3/30; F01N 7/18
[52] U.S. Cl. .................................. 422/171; 422/172; 422/179; 422/180
[58] Field of Search ............... 422/171, 172, 179, 180; 60/299; 29/157 R, 455 R

[56] References Cited

U.S. PATENT DOCUMENTS

| 3,854,888 | 12/1974 | Frietzsche et al. ................... 422/179 |
| 3,937,617 | 2/1976 | Yaguchi ................................. 422/179 |
| 3,969,083 | 7/1976 | Givens et al. ........................ 422/179 |
| 4,049,388 | 9/1977 | Scheitlin et al. ..................... 422/171 |

FOREIGN PATENT DOCUMENTS

| 2319606 | 11/1974 | Fed. Rep. of Germany ........... 422/171 |
| 2608843 | 9/1977 | Fed. Rep. of Germany ........... 422/171 |

Primary Examiner—Bradley Garris
Attorney, Agent, or Firm—Wenderoth, Lind & Ponack

[57] ABSTRACT

A catalytic converter for effecting purification of automobile exhaust gases comprises a casing having inlet and outlet, at least two separate catalyst carriers within the casing, a spacer ring element for connecting the catalyst carriers together in longitudinally spaced and aligned relation to each other to provide a single unitary structure of catalyst carriers, and a cushioning layer positioned in compressed sandwich fashion between the unitary structure and the casing.

4 Claims, 9 Drawing Figures

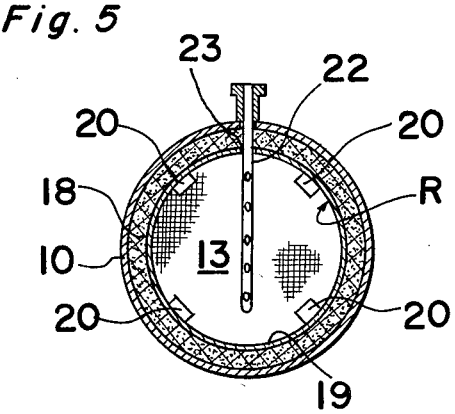
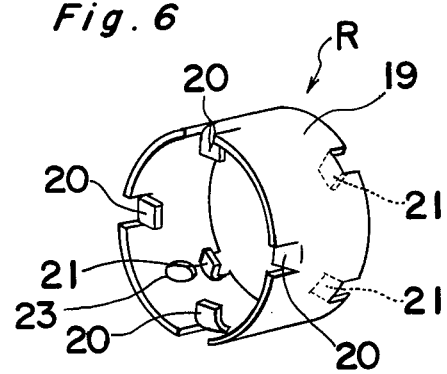
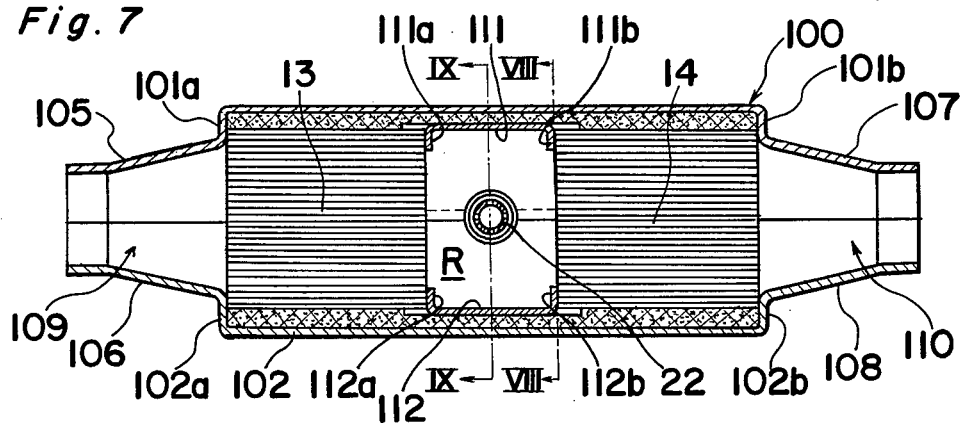
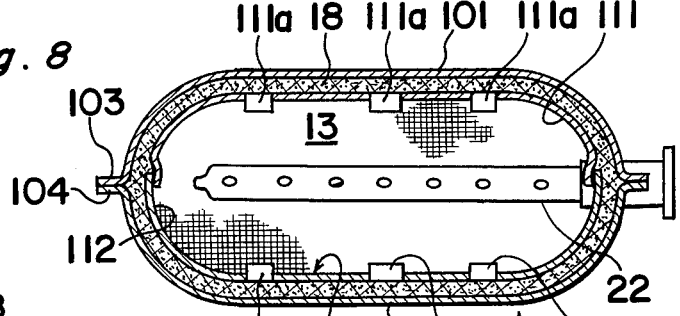
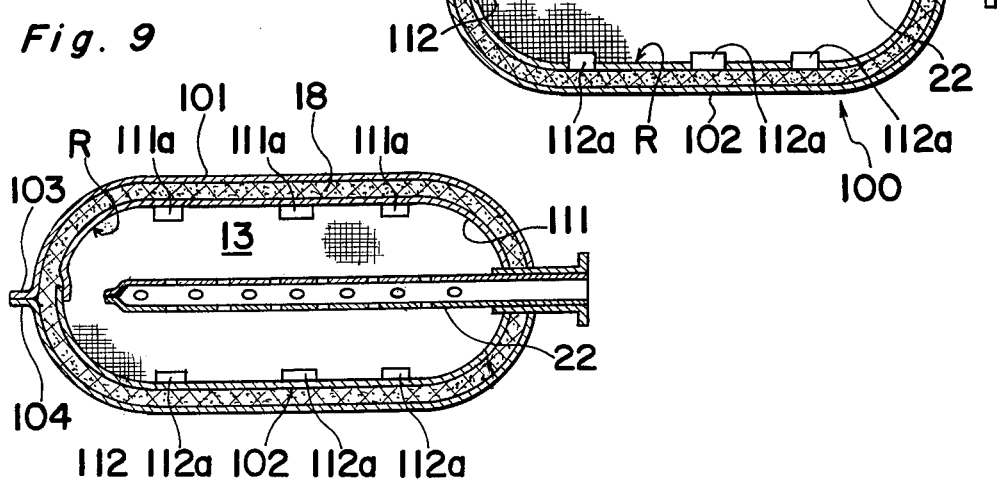

CATALYTIC CONVERTER FOR PURIFYING GASES

BACKGROUND OF THE INVENTION

The present invention generally relates to a catalytic converter for the purification of exhaust gases and, more particularly, to a catalytic converter utilizing solid honeycomb type catalyst carriers.

The type of catalytic converter to which the present invention pertains is largely used in an automobile for the substantial purification, or minimization, of pollutants present in exhaust gases emitted from an automobile internal combustion engine. In general, in a catalytic converter utilizing a solid honeycomb type catalyst carrier, the carrier has numerous design limitations and, because of these design limitations, a carrier having a relatively small length for a given pattern of flow of exhaust gases therethrough is considered to be most desirable. Speaking conversely, if the carrier has a relatively large length, not only does the manufacture of the carrier by the use of the existing extrusion technique involve difficulties, but similar difficulties are also involved in depositing a catalyst on surfaces of macropores, which communicate with generally parallel closely adjacent flow passages in the carrier, at a portion substantially intermediate of the length of the carrier. In addition, the greater the length of the carrier, the more likely the occurrence of uneven distribution of heat energies evolved in the carrier, which may in turn result in undesirable thermal deformation of the carrier thereby reducing the durability of the catalytic converter as a whole.

In order to improve the handling capacity of the catalytic converter with respect to a relatively large amount of exhaust gases, the employment of two or more catalyst carriers in one catalytic converter has fairly recently been practised. Shown in FIGS. 1 to 3 of the accompanying drawings is one example of the prior art catalytic converter utilizing two catalyst carriers, reference to which will now be made.

Referring to FIGS. 1 to 3, particularly to FIG. 1, the prior art catalytic converter comprises a cylindrical metallic casing 10 having generally frusto-conical metallic end closure members 11 and 12 secured at respective ends of the casing 10 and protruding outwardly therefrom in alignment with the longitudinal axis of the casing 10. Each of the end closure members 11 and 12 is in the form of a duct, and the end closure members 11 and 12 provide respective inlet and outlet openings of the casing 10. The casing 10 has a pair of catalyst carriers 13 and 14 installed therein in spaced relation to each other and in axially aligned relation to the casing 10, each of the catalyst carriers 13 and 14 being of a honeycomb type having a plurality of generally parallel closely adjacent flow passages 13a or 14a extending longitudinally of the carrier 13 or 14. Each of the carriers 13 and 14 also has a catalyst deposited on surfaces of macropores communicating with the flow passages 13a or 14a and surfaces defining the flow passages 13a and 14a.

The prior art catalytic converter shown is so designed that the exhaust gases entering the casing 10 through the end closure member 11 can flow into the space S between the carriers 13 and 14 through the flow passages 13a in the carrier 13 in contact with the catalyst and, after having been stirred in the space S to enable the exhaust gases to be introduced uniformly into the flow passages 14a in the carrier 14, flow towards the end closure member 12 and then towards the atmosphere through the flow passages 14a in the carrier 14 in contact with the catalyst.

In order to avoid any possible vibrations of the catalyst carriers 13 and 14 relative to the casing 10 which would result in damage to the catalyst carriers 13 and 14, the prior art catalytic converter further comprises an annular spacer ring 15 for retaining the catalyst carriers 13 and 14 in substantially permanently spaced relation to each other and a cushioning layer 16 or 17 for each catalyst carrier 13 or 14 positioned within an annular clearance between the casing 10 and the corresponding catalyst carrier 13 or 14. The annular spacer ring 15 is of a type having an outer diameter substantially equal to the inner diameter of the casing 10 and having a substantially intermediate portion 15a radially inwardly recessed to provide a generally U-sectioned spacer. Within the casing 10, this annular spacer ring 15 is installed in such a manner that the opposed end portions of the spacer ring 15 overlie respectively the opposing inner ends of the associated catalyst carriers 13 and 14 through the cushioning layers 16 and 17 on the catalyst carriers 13 and 14 and the spacer 15a protrudes a predetermined distance radially inwardly into the space S to keep the catalyst carriers 13 and 14 positioned on respective sides of such spacer 15a.

Each of the cushioning layers 16 and 17 is made of a web of metallic mesh fabric or a knitted web of ceramic fibers and is mounted on the corresponding catalyst carrier 13 or 14 by wrapping the cushioning web therearound prior to the catalyst being inserted into the casing 10.

Because of the employment of the separate cushioning layers 16 and 17, the illustrated prior art catalytic converter requires time-consuming and cumbersome assemblage which tends to adversely affect the cost of the catalytic converter. Furthermore, since the cushioning layers 16 and 17 on the respective catalyst carriers 13 and 14 are mounted in compressed sandwich fashion within the casing 10, a portion of one or both of the cushioning layers 16 and 17 tends to be squeezed into the space S, in a manner such as shown in FIG. 3, through a clearance between the spacer ring 15 and the corresponding catalyst carrier 13 and 14. This often happens when the catalyst converter is assembled by inserting the catalyst carrier 13 or 14 with the corresponding cushioning layer 16 or 17 thereon into the casing 10, then inserting the annular spacer ring 15 and finally inserting the other catalyst carrier 14 or 13 with the corresponding cushioning layer 17 or 16 thereon into the casing 10.

Other examples of prior art catalytic converters utilizing two or more catalyst carriers are disclosed in the U.S. Pat. Nos. 3,937,617 and 3,969,083, both patented in 1976. The catalytic converter disclosed in the first mentioned U.S. patent is substantially similar to that discussed above with reference to FIGS. 1 to 3, except that the annular spacer ring used therein has a rectangular cross section. The catalytic converter constructed according to the first mentioned U.S. patent has the cushioning layers held within the casing in compressed sandwich fashion after having been inserted into the casing together with the catalyst carrier and they are bonded to the casing by the utilization of a plug welding technique which applies weld deposits from apertures in the casing into the cushioning layers thereby simultaneously connecting the cushioning layers to the wall of the casing and closing the apertures in the casing.

As compared with the prior art catalytic converter of the construction shown in FIGS. 1 to 3, the prior art catalytic converter disclosed in the first mentioned U.S. patent appears to be satisfactory and effective in terms of rigid retention of the catalyst carrier within the casing, but the employment of the plug welding method causes the assemblage of the catalytic converter to be not only time-consuming and cumbersome, but also expensive.

The second mentioned U.S. patent discloses a catalytic converter utilizing at least two catalyst carriers housed within the casing in spaced relation to each other and spaced from each other by means of an annular spacer ring of substantially U-shaped cross section while the outer peripheries of the respective catalyst carriers are held in direct contact with the casing. In order to attain a rigid connection between the catalyst carriers in spaced relation to each other, the peripheral edges of the catalyst carriers, which face each other in the assembled condition of the catalytic converter, are chamfered on one hand and a pair of cushioning rings, each made of a knitted sleeve of metallic wire compressed into a generally triangular cross-sectional configuration, are positioned within respective triangular-section spaces defined by the chamfered peripheral edge of the corresponding catalyst carrier, the casing and the annular spacer ring.

In the prior art catalytic converter disclosed in the second mentioned U.S. patent, since the catalyst carriers are in direct contact with the casing, there is the possibility that the thermal efficiency of the catalyst carriers will be adversely be affected to such an extent as to reduce the purifying efficiency of the catalytic converter.

SUMMARY OF THE INVENTION

Accordingly, the present invention has been developed with a view to substantially eliminating these disadvantages and inconveniences inherent in the prior art catalytic converters and has for its object to provide an improved catalytic converter wherein simple and inexpensive means for retaining the catalyst carriers within the casing is employed.

Another object of the present invention is to provide an improved catalytic converter of the type referred to above wherein the employment of the simple and inexpensive retaining means results in the employment of a single cushioning layer for all of the catalyst carriers, thereby enabling easy and ready mounting of the catalyst carriers in the casing.

A further object of the present invention is to provide an improved catalytic converter of the type referred to above which can, therefore, be manufactured at reduced cost and in a simple manner without requiring any complicated and time-consuming manufacturing procedures.

These and other objects of the present invention can readily be accomplished by utilizing a unique spacer ring means so designed as to retain the catalyst carriers in longitudinally spaced relation to each other within the casing and also to enable the single knitted web of heat-insulating and cushioning material to be wrapped around the assembly of the catalyst carriers and the spacer ring means prior to the insertion of such assembly into the casing, said knitted web of heat-insulating and cushioning material forming a heat-insulating and cushioning layer in compressed sandwich fashion within the casing when and after the assembly has been inserted into the casing together with the heat-insulating and cushioning web.

In accordance with the present invention, the unique spacer ring means serves not only as a connecting element for connecting the catalyst carriers together, but also as a spacer necessary to keep the catalyst carriers in longitudinally spaced relation to each other. This unique spacer ring means has a pair of a plurality of, for example, at least two, stop pawls with which the catalyst carriers connected together by the same spacer ring means are engaged in longitudinally spaced relation, the space between the catalyst carriers corresponding to the space between the pairs of the stop pawls.

BRIEF DESCRIPTION OF THE DRAWINGS

These and other objects and features of the present invention will become apparent from the following description of preferred embodiments thereof taken in conjunction with the accompanying drawings, in which:

FIG. 5 is a cross sectional view, on a somewhat reduced scale, taken along the line V—V in FIG. 4;

FIG. 6 is a perspective view of a spacer ring used in the catalytic converter shown in FIG. 4;

FIG. 7 is a view similar to FIG. 4, showing another preferred embodiment of the present invention; and FIGS. 8 and 9 are cross sectional views taken along the lines VIII—VIII and IX—IX shown in FIG. 7, respectively.

DETAILED DESCRIPTION OF THE INVENTION

Figure 1:
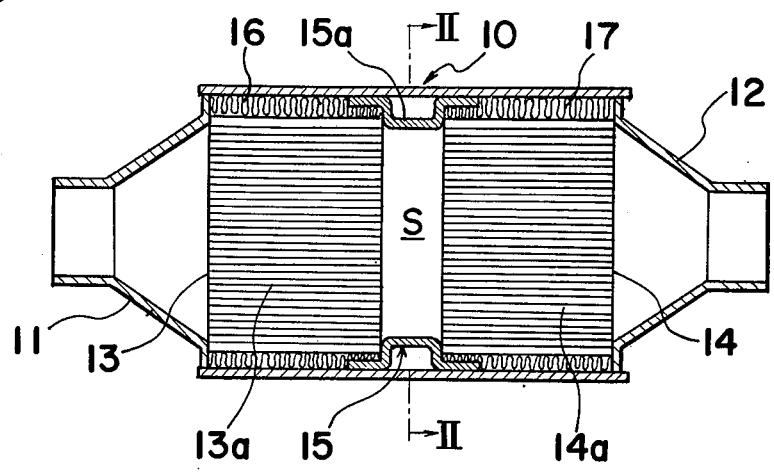
FIG. 1 is a longitudinal sectional view of the prior art catalytic converter.
Figure 2:
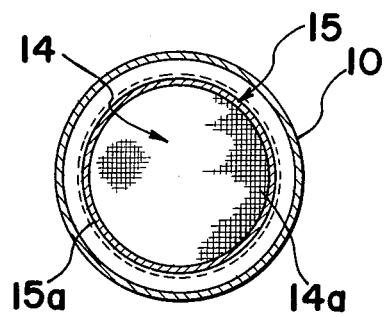
FIG. 2 is a cross sectional view, on a somewhat reduced scale, taken along the line II—II in FIG. 1.
Figure 3:
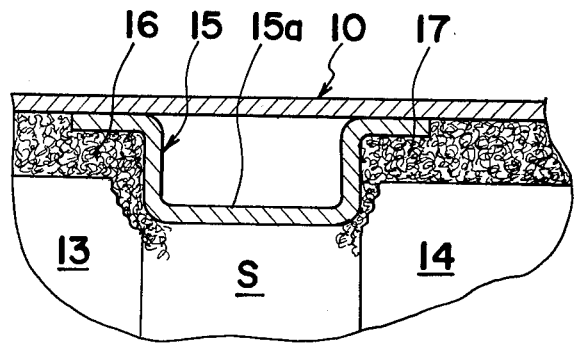
FIG. 3 is a longitudinal sectional view of a portion of the prior art catalytic converter shown in FIG. 1.

Before the description of the present invention proceeds, it is to be noted that like parts are designated by like reference numerals throughout the accompanying drawings. It is also to be noted that, although the present invention is applicable to a catalytic converter using three or more catalyst carriers, it will be described as applied to a catalytic converter using two catalyst carriers for the sake of brevity.

Figure 4:
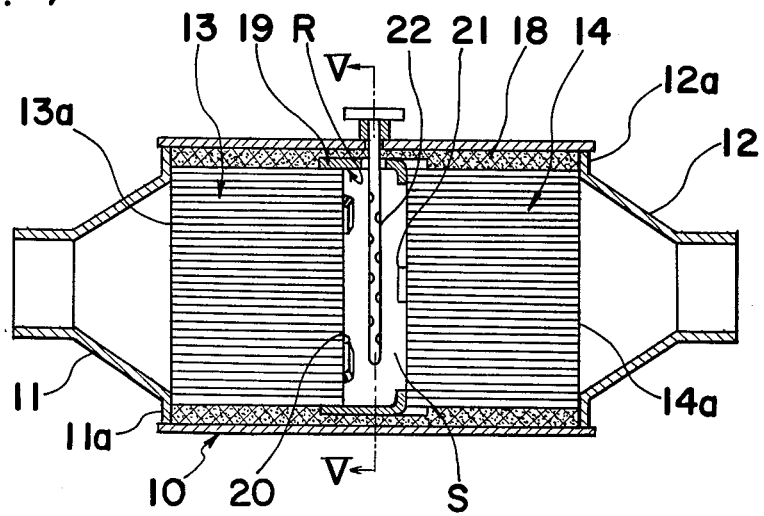
FIG. 4 is a longitudinal sectional view of a catalytic converter according to a preferred embodiment of the present invention.

Referring now to FIGS. 4 to 6, particularly to FIGS. 4 and 5, the casing 10 has a cylindrical configuration in cross-section and has opposite ends to which the frusto-conical end closure members 11 and 12 are rigidly secured by any known method, for example, by the application of weld deposits to the individual joints between radially outwardly protruding flanges 11a and 12a of the respective end closure members 11 and 12 and the wall of the casing 10. It is to be noted that each of the radially outwardly protruding flanges 11a and 12a of respective end closure members 11 and 12 has an inner diameter smaller than the diameter of the solid honeycomb type catalyst carriers 13 and 14 employed. As is well known to those skilled in the art, the honeycomb type catalyst carriers 13 and 14 are generally made of a porous, inert, solid, refractory material in skeletal form with the parallel closely adjacent flow passages 13 and 14 defined therein and extending throughout the longitudinal extent thereof. The catalyst carriers 13 and 14 have a catalyst deposited on surfaces of macropores communicating with the flow passages 13a and 14a and also surfaces defining the flow passages 13a and 14a. The catalysts deposited on the catalyst carriers 13 and 14 are preferably a reduction catalyst and an oxidization catalyst, respectively, although the same or a combination catalyst may be utilized on both carriers.

The catalyst carriers 13 and 14 are mounted within the casing 10 in longitudinally spaced relation to each other with a single cushioning layer 18 positioned in compressed sandwich fashion between the outer peripheral surfaces of the respective catalyst carriers 13 and 14 and the wall of the casing 10. These catalyst carriers 13 and 14 within the casing 10 are connected together and kept in spaced relation to each other by means of a spacer ring means generally identified by R and made of a metallic material, preferably a steel material.

The spacer ring means R employed in the embodiment shown in FIGS. 4 and 5 comprises, as best shown in FIG. 6, an annular ring body 19 having an inner diameter substantially equal to or slightly larger than the diameter of any one of the catalyst carriers 13 and 14 and an outer diameter smaller than the inner diameter of the casing 10. This annular ring body 19 has two sets of two or more, for example, four as illustrated, stop pawls 20 and 21 protruding radially inwardly therefrom, each set of said stop pawls 20 and 21 being positioned within the interior of the annular ring body 19 at a location spaced a certain distance from the respective end extremity of the annular ring body 19. Preferably, the stop pawls 20 and 21 of these sets are alternately positioned one after another in the circumferential direction of the annular ring body 19 as best shown in FIG. 6.

It is to be noted that, as illustrated, each of the stop pawls 20 and 21 of these sets is formed by the use of any known metal press operation, for example, by bending a portion at the respective end of the annular ring body 19 radially inwardly of the annular ring body 19, leaving a respective cutout at such end of the annular ring body.

The cushioning layer 18 may be of any known material such as described in connection with the illustrated prior art and is preferably made of a knitted web of metallic mesh fabric which also serves as a heat insulator. This knitted cushioning web is, after the catalyst carriers 13 and 14 are assembled together with the annular ring body 19 positioned therebetween, wrapped around the assembly in one or more convolutions prior to the insertion of the assembly into the casing 10. The knitted cushioning web thus wrapped around the assembly of the catalyst carriers 13 and 14 and the annular ring body 19 is, when the assembly is inserted into the casing 10, held in compressed sandwich fashion within a clearance between the casing 10 and the assembly thereby forming the cushioning layer 18.

Where the inner diameter of the annular ring body 19 is slightly larger than the diameter of any one of the catalyst carriers 13 and 14, the use of any suitable bonding agent of a type which, when solidified, has a high thermal resistance and, simultaneously, serves as a filler material is recommended not only to connect the corresponding catalyst carrier to the annular ring body 19, but also to fill up any possible clearance between the corresponding catalyst carrier and the annular ring body 19. Where the inner diameter of the annular ring body 19 is substantially equal to the diameter of any one of the catalyst carriers 13 and 14, it is possible to connect the corresponding catalyst carrier to the annular ring body 19 under pressure although any suitable bonding agent may also be used.

Hereinafter, the manner in which the catalytic converter of the construction hereinbefore described is assembled will be described. In the first place, the catalyst carriers 13 and 14 are connected together in longitudinally spaced relation to each other by the use of the annular ring body 19 with ends of the respective catalyst carriers 13 and 14 inserted into the annular ring body 19 in the opposite directions with respect to each other until they abut the sets of the stop pawls 20 and 21. At this time, the bonding agent is preferably used to connect the ends of the respective catalyst carriers 13 and 14 to the annular ring body 19. The knitted cushioning web is then wrapped around the assembly thus formed, the knitted cushioning web being of a type having a width equal to the overall longitudinal length of the assembly. Thereafter, the assembly with the knitted cushioning web wrapped therearound is inserted into the casing 10 while the knitted cushioning web is caused to be compressed radially inwardly as the assembly is inserted. The knitted cushioning web forms the cushioning layer 18 at the time of and after the completion of insertion of the assembly together with such knitted cushioning web. During the insertion of the assembly with the knitted cushioning web thereon into the casing 10, the casing 10 may have one of the end closure members 11 or 12 already secured to the corresponding end thereof and the other of the end closure member 12 or 11 is secured to the other end of the casing 10 after the completion of insertion of the assembly into the casing 10. Alternatively, the end closure members 11 and 12 may be sequentially secured to the corresponding ends of the casing 10 after the completion of insertion of the assembly into the casing 10.

Referring still to FIGS. 4 and 5, reference numeral 22 represents a secondary air supply nozzle having one end flanged and situated externally of the casing 10 and the other end protruding into the space S between the catalyst carriers 13 and 14 through the casing 10, then the cushioning layer 18 and finally an opening 23 defined in the annular ring body 19, the function of said air supply nozzle 22 being well known to those skilled in the art. However, briefly speaking, the secondary air supply nozzle 22 is used to supply fresh air into the space S to facilitate not only the stirring of the exhaust gases ready to flow into the catalyst carrier on the downstream side with respect to the direction of flow of the exhaust gases, but also oxidization of the exhaust gases flowing through the catalytic converter. This secondary air supply nozzle 22 may not be always necessary. However, if used, it may be installed after the manufacture of the catalytic converter has completed, with a portion of the nozzle 22 adjacent the flanged end welded to the casing 10.

Although the spacer ring means R has been described as constituted by the annular ring body 19 in the foregoing embodiment shown particularly in FIGS. 4 and 5, it may be constituted by a pair of mating split ring segments which, when assembled together, have a shape similar to the annular ring body 19 shown in FIG. 6.

Shown in FIGS. 7 to 9 is an example in which the concept of the present invention is applied to a catalyst converter of a substantially flattened, generally elliptical cross-section configuration, reference to which will now be made.

Referring to FIGS. 7 to 9, the substantially flattened catalytic converter comprises a generally elliptical cross-section metallic casing 100 including top and bottom shells 101 and 102 of identical construction each having a peripheral flange 103 or 104 extending outwardly therefrom substantially about its entire periphery. The top shell 101 has at its opposed ends with generally semi-cylindrical downwardly concave portions 105 and 107 with steps defined at 101a and 101b, and similarly the bottom shell 102 is formed at its opposed ends with generally semi-cylindrical upwardly concave portions 106 and 108 with steps defined at 102a and 102b. The concave portions 105 and 107 of the top shell 101 cooperate with the concave portions 106 and 108 of the bottom shell 102, respectively, so that when the top and bottom shells 101 and 102 are flanged together, that is, placed one above the other with the peripheral flanges 103 and 104 welded together, the concave portions 105 and 106 define an outwardly tapering, generally frusto-conical inlet duct 109 and the concave portions 107 and 108 define an outwardly tapering, generally frusto-conical outlet duct 110.

Within the casing 100, the catalyst carriers 13 and 14 are installed in longitudinally spaced relation to each other in alignment with the inlet and outlet ducts 109 and 110, it being however understood that each of the catalyst carriers 13 and 14 employed in this embodiment shown in FIGS. 7 to 9 has cross sectional shape similar to the cross sectional shape of the casing 100.

The spacer ring means R employed in the embodiment shown in FIGS. 7 to 9 is constituted by a pair of mating split ring segments 111 and 112 having a generally semi-elliptical shape such that when these split ring segments 111 and 112 are assembled together with the opposite side edge portions of the split ring segment 111 contacting the respective opposite side edge portions of the split ring segment 112 in overlapping relation to each other as best shown in FIGS. 8 and 9, the split ring segments 111 and 112 together have a generally elliptical shape similar to the cross sectional representation of the catalyst carriers 13 and 14. Each of these split ring segments 111 and 112 has two spaced sets of one or more, for example, three, spaced stop pawls 111a and 111b or 112a and 112b, all of the stop pawls 111a and 112a and all of the stop pawls 111b and 112b being respective functional equivalents of, and formed in a similar manner to, the pairs of the stop pawls 20 and 21 in the annular ring body 19 employed in the foregoing embodiment.

The catalytic converter according to the embodiment shown in FIGS. 7 to 9 can be assembled in a substantially similar manner to that described in connection with the embodiment of FIGS. 3-6. More specifically, after the catalyst carriers 13 and 14 have been connected together in spaced relation to each other by the use of the split ring segments 111 and 112 and then wrapped with the knitted cushioning web, the assembly is placed on the bottom shell 102 and the top shell 101 is subsequently flanged to the bottom shell 102. At the time of completion of the assemblage, the knitted cushioning web is held in compressed sandwich fashion between the casing 100 and the assembly of the catalyst carriers 13 and 14 spacedly connected together with the spacer ring means R, thereby forming the cushioning layer 18.

Even in the embodiment shown in FIGS. 7 to 9, although the spacer ring means R has been described as constituted by the pair of the split ring segments 111 and 112, it may be constituted by a single annular sleeve member similar in construction to the annular ring body shown in FIG. 6. In this case, the annular sleeve member has to be flattened to assume a cross sectional shape complementary to the cross sectional shape of the catalyst carriers 13 and 14.

From the foregoing description of the present invention, it is clear that the catalyst converter according to the present invention can be readily and economically manufactured because of the unique spacer ring means. This unique spacer ring means is effective not only to connect the catalyst carriers together in longitudinally spaced relation to each other, but also to enable the use of a single cushioning layer wrapped around both of the catalyst carriers. Because of the single cushioning layer, the catalyst carriers and the space therebetween can advantageously be kept in heat insulated relation to the casing. Nevertheless, not only can an arbitrary displacement of the catalyst carriers relative to each other be prevented, but also transmission of vibrations of the casing to the assembly of the catalyst carriers can be minimized.

Although the present invention has fully been described in connection with the preferred embodiments thereof with reference to the accompanying drawings, it is to be noted that various changes and modifications will be apparent to those skilled in the art. By way of example, although the cushioning layer has been described as constituted by a knitted web of cushioning material, preferably metallic mesh fabric, it may be constituted by a sleeve of the same material.

Moreover, where the number of the catalyst carriers in one casing is more than two such as illustrated, it will readily be seen that the number of the spacer ring means to be employed should be one less than the number of the catalyst carriers, one positioned between each adjacent two catalyst carriers.

Accordingly, such changes and modifications are to be understood as being included within the true scope of the present invention unless they depart therefrom.

We claim:

1. A catalytic converter for effecting purification of exhaust gases by catalytic reaction, which comprises, in combination:

a generally elongated casing having at one end an inlet for receiving the exhaust gases and at the other end an outlet for discharging the exhaust gases which have been passed through the casing;

at least two separate catalyst carriers of honeycomb type positioned in said casing and each having a plurality of parallel closely adjacent flow passages extending throughout the length thereof;

a spacer ring means between said catalyst carriers and connecting the catalyst carriers together in longitudinally spaced relation in a unitary structure, said spacer ring means being an annular spacer body having a cross-sectional shape similar to that of said catalyst carriers and a size for securing the ends of said catalyst carriers therein, and two sets of stop pawls each having at least two stop pawls protruding radially inwardly from the annular spacer body, one set adjacent each end of said spacer body, each stop pawl in a set being spaced inwardly from a corresponding end of said spacer body, said annular spacer body having the opposed ends of the adjacent catalyst carriers within said spacer body and abutting the pawls of the corresponding sets and holding the catalyst carriers in alignment with the longitudinal axis of the casing and retaining the catalyst carriers in position in the unitary structure; and a heat-insulating and cushioning layer positioned in compressed sandwich fashion between the unitary structure and the casing and surrounding the unitary structure.

2. A catalytic converter as claimed in claim 1, wherein each of the stop pawls is formed by bending a corresponding end portion of the annular spacer body in a direction radially inwardly of the annular spacer body.

3. A catalytic converter as claimed in claim 2, wherein the cushioning layer is constituted by a knitted web of metallic mesh fabric.

4. A catalytic converter as claimed in claim 2, further comprising an air supply nozzle having one end situated externally of the casing for fluid-connection to a source of air and the other end extending into the space between the catalyst carriers inside the casing, said air supply nozzle supplying air into the space between the catalyst carriers.

* * * * *